United States Patent
Zhang et al.

(10) Patent No.: US 11,467,949 B2
(45) Date of Patent: Oct. 11, 2022

(54) TECHNIQUES AND ARCHITECTURES FOR PROVIDING AN ISOLATED RUNTIME CONTEXT IN A SHARED ENVIRONMENT

(71) Applicant: salesforce.com, inc., San Francisco, CA (US)

(72) Inventors: Heng Zhang, San Jose, CA (US); Utsavi Benani, Fremont, CA (US); Zhidong Ke, Milpitas, CA (US)

(73) Assignee: salesforce.com, inc., San Francisco, CA (US)

( * ) Notice: Subject to any disclaimer, the term of this patent is extended or adjusted under 35 U.S.C. 154(b) by 121 days.

(21) Appl. No.: 17/108,875

(22) Filed: Dec. 1, 2020

(65) Prior Publication Data

US 2022/0171696 A1 Jun. 2, 2022

(51) Int. Cl.
| | |
|---|---|
| *G06F 11/00* | (2006.01) |
| *G06F 11/36* | (2006.01) |
| *G06F 8/60* | (2018.01) |
| *G06F 8/61* | (2018.01) |

(52) U.S. Cl.
CPC ............ *G06F 11/3688* (2013.01); *G06F 8/60* (2013.01); *G06F 8/61* (2013.01); *G06F 11/3664* (2013.01); *G06F 11/3684* (2013.01)

(58) Field of Classification Search
CPC .......... G06F 8/60; G06F 8/61; G06F 11/3664; G06F 11/3684; G06F 11/3688
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |

(Continued)

*Primary Examiner* — Joshua P Lottich
(74) *Attorney, Agent, or Firm* — Kwan & Olynick LLP (57) ABSTRACT

Mechanisms and techniques for providing an isolated runtime environment are disclosed. Scoped properties are generated utilizing a namespace identifier. The namespace identifier is an identifier used to define a scope of at least an isolated application runtime context. Scoped objects are generated corresponding to one or more dependent services utilizing the one or more scoped properties and the namespace identifier. A target application is deployed to a container corresponding to the isolated application runtime context. The target application interacts with at least some of the dependent services utilizing the namespace identifier. At least one integration test is run on the target application in the container. The integration tests refer to the isolated application runtime context utilizing the namespace identifier.

20 Claims, 5 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2009/0327221 A1* | 12/2009 | Noll .................... G06F 16/176 |
| 2015/0261560 A1* | 9/2015 | Sliwa .................... G06F 9/5077 718/1 |
| 2016/0055188 A1* | 2/2016 | Goel .................... G06F 21/6218 707/741 |
| 2018/0253377 A1* | 9/2018 | Liang .................... G06F 12/0802 |
| 2018/0309583 A1* | 10/2018 | Bate .................... H04L 9/3247 |
| 2019/0392136 A1* | 12/2019 | Ganchev ................ G06F 21/53 |

* cited by examiner

TECHNIQUES AND ARCHITECTURES FOR PROVIDING AN ISOLATED RUNTIME CONTEXT IN A SHARED ENVIRONMENT

TECHNICAL FIELD

Embodiments relate to techniques for providing an isolated runtime context, for example, in a shared Databrick-type environment. More particularly, embodiments relate to techniques for providing an isolated runtime context, for example, in a shared Databrick-type environment supporting integrations with multiple external services.

BACKGROUND

A "data lake" is a collection data from multiple sources and is not stored in a standardized format. Because of this, collection of the data in the data lake is not as systematic and predictable as more structured collections of data. Thus, many of the tools that are utilized to ingest data into a data lake (or other data collection structures) do not (or cannot) provide atomic writes to the final data source.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

Some embodiments described herein can be based on a Databricks-based architecture, which is a cloud platform for running data lake applications. Databricks is available from Databricks, Inc. of San Francisco, Calif., USA. Databricks can provide a unified analytics platform that can host and run any number of apps. These embodiments are sample embodiments and other configurations with other architectures and mechanisms to support data lake applications can be provided. For example, Azure Databricks available from Microsoft could be utilized.

Some data lake implementations are based on Apache Hadoop, which provides various software utilities that provide distributed processing of large data sets across multiple computing devices. Other data lake implementations can be based on Apache Spark, which provides a framework for real time data analytics using distributed computing resources. Other platforms and mechanisms can be utilized to manage data lakes (or other large collections of data). Both Hadoop and Spark are available from The Apache Software Foundation of Wakefield, Mass., USA.

Delta Lake Spark applications in association with a Databrick environment can provide a richly integrated operating environment with external services that include, for example, Apache Kafka for streaming processing, Delta Lake Tables for structured query language (SQL) operations, Amazon Web Services (AWS) for reading and writing data, Apache Zookeeper for coordination, Splunk or Sumo Logic for external logging services, and Datadog for monitoring services.

Delta Lake Spark applications and their dependent services can utilize a runtime application context in a shared Databricks environment where activities such as, for example, deployment, testing, production running, can occur. In a Delta Lake Spark Applications embodiment, a runtime context refers to the Delta Lake Spark Applications and the artifacts created in the corresponding dependent services. Without some level of isolation in this environment there will be conflicts. For example, the testing of a new feature that introduces a table schema change could interfere with other applications that refer to the same table. Further, it is currently not possible to incorporate integration testing automation into a continuous integration/continuous deployment (CI/CD) pipeline without an isolated runtime environment for builds.

The description that follows provides embodiments that provide isolated application runtime contexts that can be used in, for example, a shared Databricks environment, that can be deployed from a local deployment environment and/or integrated into a CI/CD pipeline. As used herein, an isolated runtime context is a group of artifacts created in the dependent services and decorated with the same namespace and privately accessible by the applications (e.g., Delta Lake Spark Applications) that know of the namespace.

Within the application, an isolated runtime context can be a data structure of key/value pairs. In one embodiment, the key can be the artifact type and the value can be a namespace-decorated reference to the artifact in a dependent service. While the examples that follow are primarily based around a shared Databricks environment, other environments can be utilized to provide comparable functionality utilizing the concepts and techniques described herein.

Figure 1:
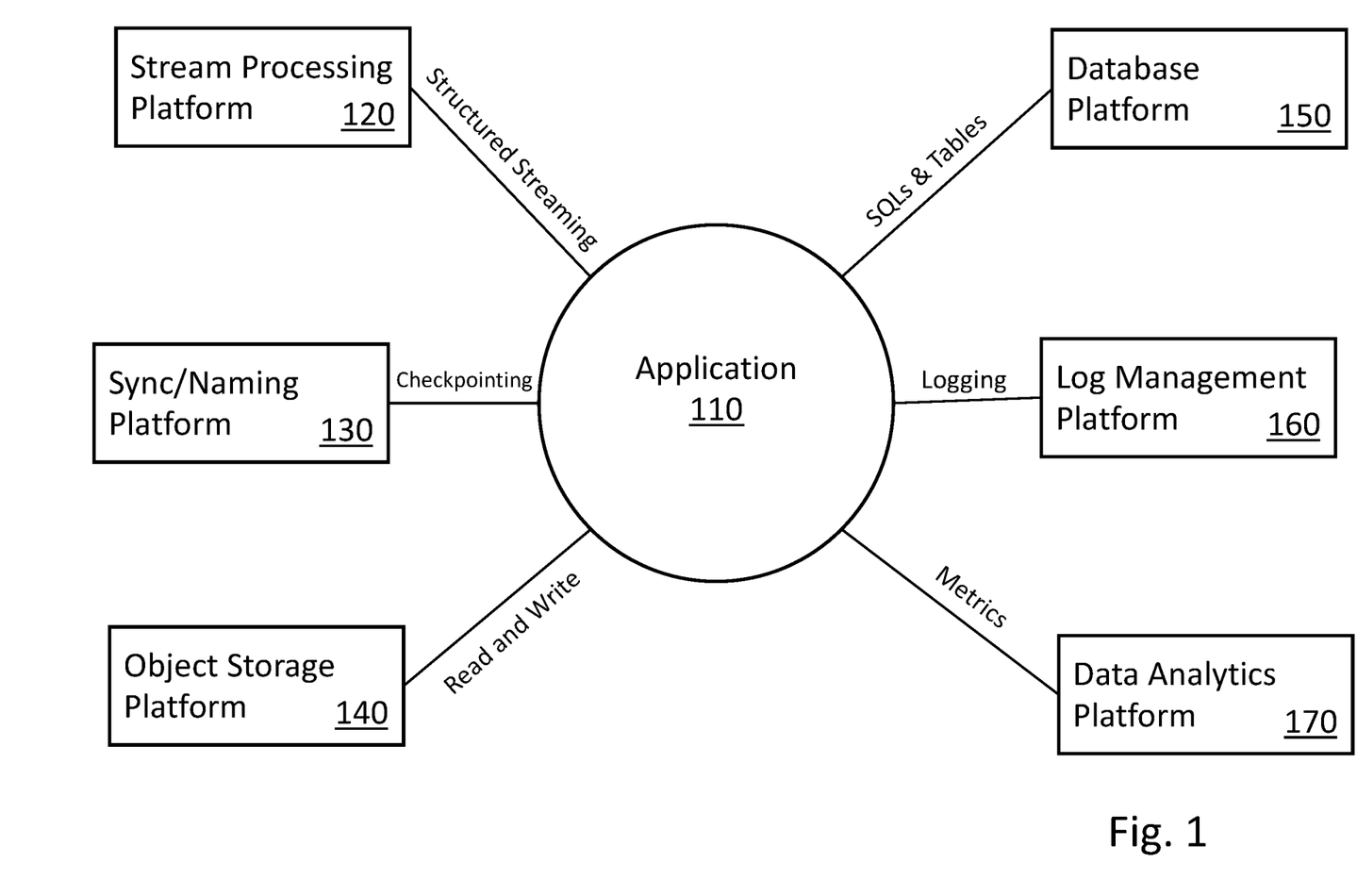
FIG. 1 is a conceptual diagram of one embodiment of an environment that can provide one or more isolated runtime environments.

FIG. 1 is a conceptual diagram of one embodiment of an environment that can provide one or more isolated runtime contexts. In the example of FIG. 1, application 110 utilizes several external applications that provide specific services. These external applications can provide services to many client applications, each of which can have an isolated runtime context. In various embodiments, a namespace creation/utilization mechanism can be utilized to support the isolated runtime context.

In the example of FIG. 1, application 110 can utilize structured streaming services from stream processing platform 120. In one embodiment, steam processing platform 120 can be based on Kafka, or a similar platform. Application 110 can utilize checkpointing services from sync/naming platform 130. In one embodiment, sync/naming platform 130 can be based on Apache Zookeeper, or a similar platform.

Application 110 can utilize read and write services from object storage platform 140. In one embodiment, object storage platform 140 can be based on AWS S3, or a similar platform. Further, application 110 can utilize search (e.g., SQL) and table services from database platform 150. In one embodiment, database platform 150 can be based on Delta Lake, or a similar platform.

In the example of FIG. 1, application 110 can utilize logging services from log management platform 160. In one embodiment, log management platform 160 can be based on SumoLogic, or a similar platform. Application 110 can utilize metric services from data analytics platform 170. In one embodiment, data analytics platform 170 can be based on DataDog, or a similar platform. In alternate embodiments, additional and/or different remote applications/services can be supported.

Figure 2:
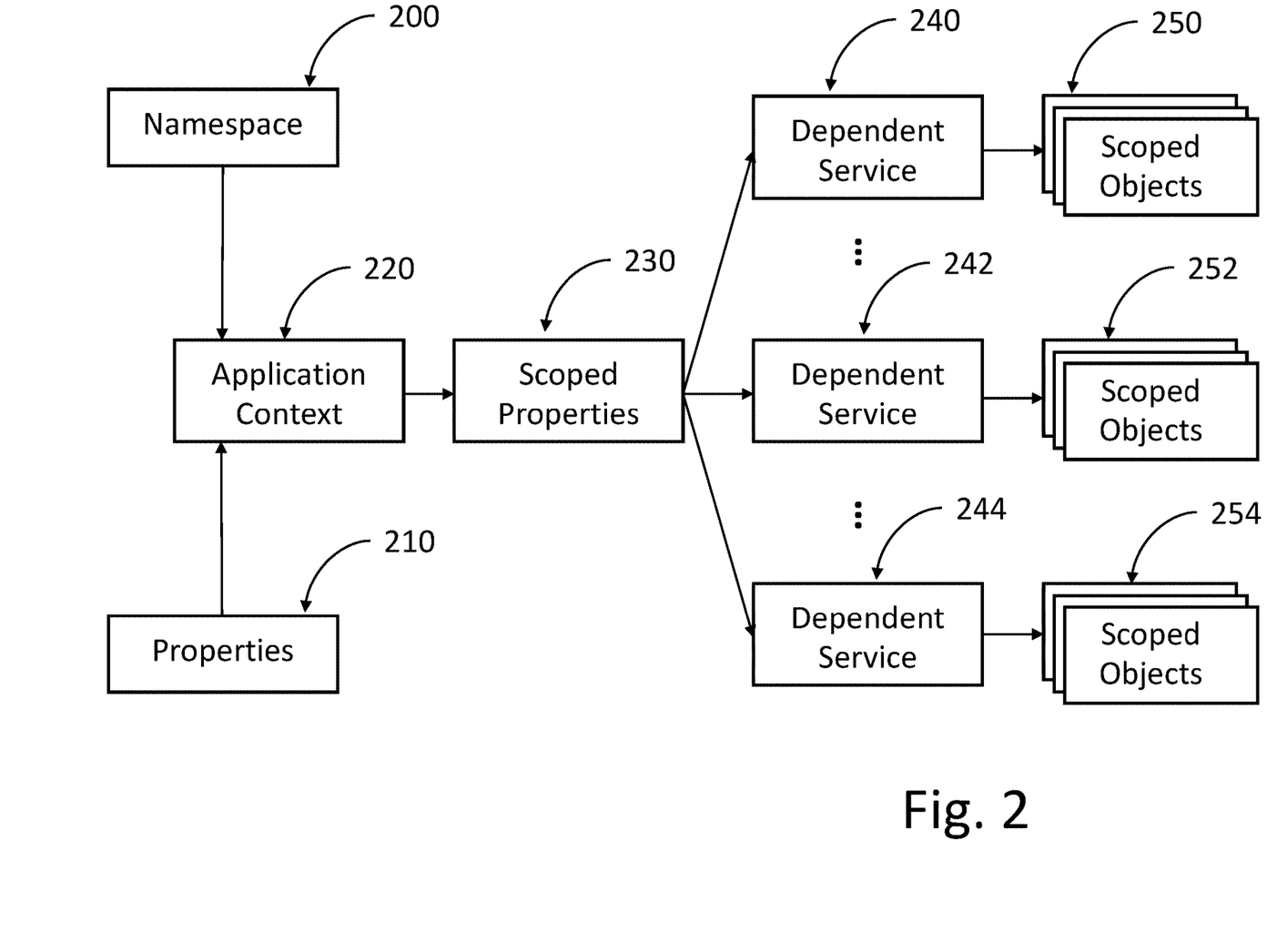
FIG. 2 provides a conceptual illustration of an isolated runtime context.

FIG. 2 provides a conceptual illustration of an isolated runtime context. In general, a namespace is a string used to define the scope of an application runtime context. Application context is an abstraction of an application runtime as a component to build an isolated runtime context. In one embodiment, it can be a Scala class. In the example of FIG. 2, a namespace and application properties are utilized as input to generate scoped properties with which dependent services can create scoped objects.

As described above, namespace 200 and properties 210 can be utilized to create application context 220. In one example embodiment, application context 220 can use the following rules to generate scoped properties 230.

| Property Key | Value | Scoped Value |
|---|---|---|
| Kafka.topics | Topic1, Topic2 | {namespace}-topic1, {namespace}-topic2 |
| Database.name | sas | {namespace}_sas |
| S3.bucket | Bucket | Bucket/namespace |
| Application_name | appName | {namespace}_appName |

The first column ("Property Key") is the set of property keys to be consumed by dependency services, second column ("Value") contains sample values for those property keys, and the third column ("Scoped Value") indicates examples of resulting scoped values. Scoped properties 230 can then be utilized to create one or more dependent services (e.g., 240, 242, 244), each of which can have corresponding scoped objects (e.g., 250, 252, 254).

In one embodiment, application context 220 takes a namespace value from a program argument or environment variable (and the program argument, in one embodiment, takes priority over the environment variable). An example of an environment variable:

Export SAS_APP_NAMESPACE=test_namespace and an example of a program argument:

sas_app_namespace=test_namespace_3

In some embodiments, a Docker image can be built to encapsulate all complexities to provide platform-agnostic functionalities. In alternate embodiments, other container-type technologies can also be supported. The following command is the kind of command that can be used to deploy an isolated runtime context on Databricks with a namespace. The following example command structure can function to set a namespace string (e.g., "test_namespace" below) as an environment variable to be passed to a container (lines 7 and 15).

```
1 export BUILD_TYPE=dev
2 export DEPLOY_ENV=dev
3 export AWS_INSTANCE_PROFILE_ARN=some_role
4 export DATABRICKS_HOST=some_host
5 export DATABRICKS_TOKEN=some_token
6 export CLUSTER_ID=some_cluster_id
7 export SAS_APP_NAMESPACE=test_namespace
8 docker run-it\
9 -v $(pwd)/core/target/scala-2.11:/app\
10 -v $(pwd)/databricks-jobs/test/:/root/jobs\
11 -e BUILD_TYPE -e DEPLOY_ENV\
12 -e DATABRICKS_HOST\
13 -e DATABRICKS_TOKEN\
14 -e CLUSTER_ID\
15 -e SAS_APP_NAMESPACE\
16 Docker.amz.relateiq.com/relateiq/engagement-store-deployment-namespace-support:0.0.
```

In the example code above, the container first reads the application deployment specifications (line 10) and passes the namespace to each application deployment as a program argument to deploy the applications to the Databricks environment. The following is an example of a deployment specification:

```
{
    "name": "$JOB_NAME",
    "existing_cluster_id": "$CLUSTER_ID",
    "spark_jar_task": {
        "parameters": [
            "$DEPLOY_ENV",
            "EngagementIngestion",
            "sas_app_namespace=$SAS_APP_NAMESPACE"
        ],
        "main_class_name": "com.salesforceiq.sas.engagement.spark.sasApp",
        "run_as_repl": true
    },
    "libraries": [
        {
            "jar": "$DBFS_JAR_PATH"
        }
    ]
}
```

After deployment, the applications names will be prefixed with the designated namespace identifier (e.g., test_namespace-CreateEngagement . . . ) and the database will be scoped with the namespace identifier (e.g., test_namespace_sas). Delta tables can then be created in the scoped database.

In embodiments utilizing AWS, the Delta Table AWS S3 location is scoped with the namespace identifier. In embodiments utilizing Kafka, topics are scoped with the namespace identifier. Metrics can also be scoped with the namespace identifier. In embodiments utilizing Zookeeper, partition offsets within Zookeeper can be scoped with the namespace identifier.

Figure 3:
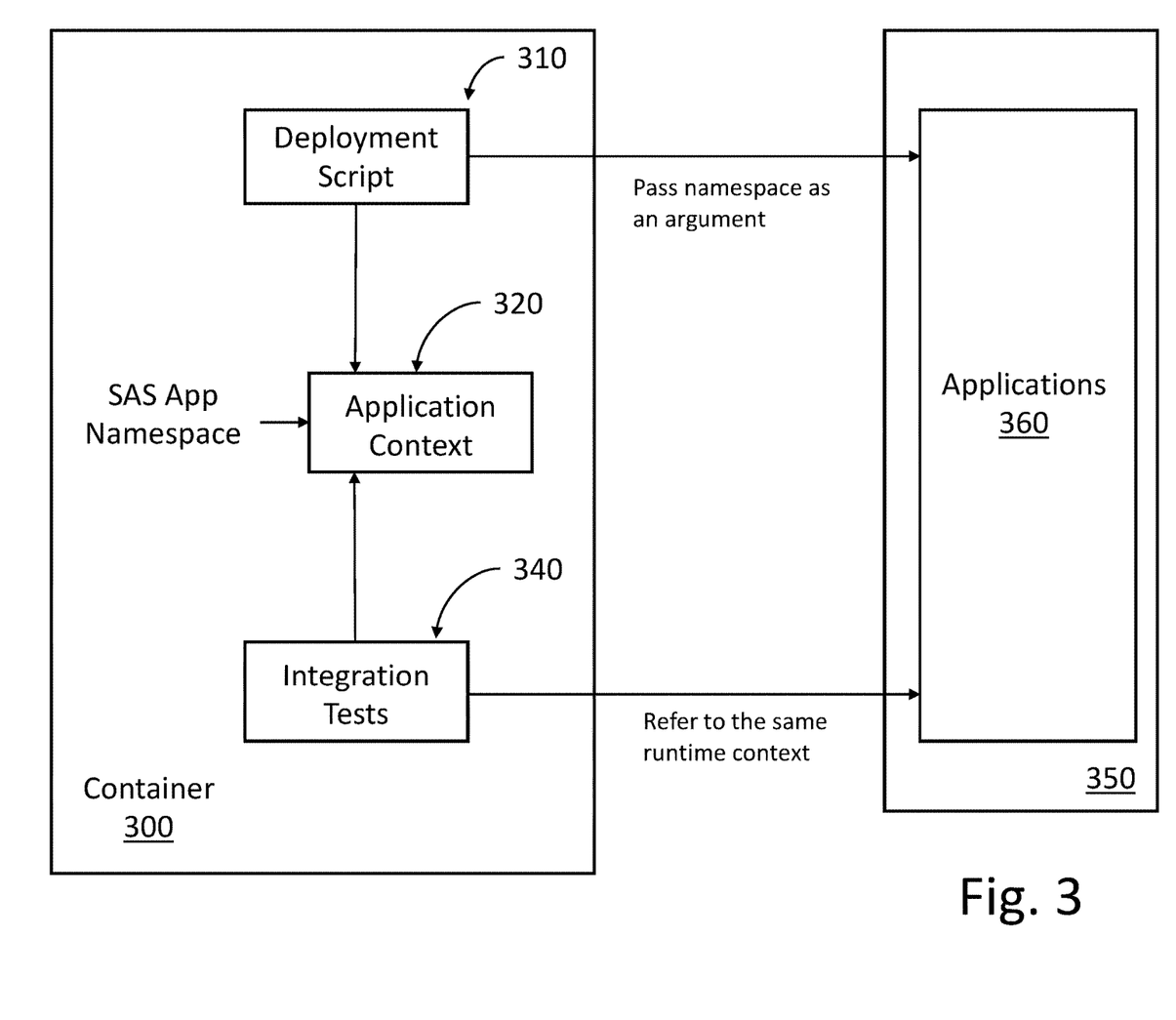
FIG. 3 is a block diagram of one embodiment of an environment utilizing namespaces to provide application context.

FIG. 3 is a block diagram of one embodiment of an environment utilizing namespaces to provide application context. In various embodiments, tests create application context object 320 with the same namespace in order to refer to the correct isolated application runtime context, 350, running any number of applications, 360. In the example of FIG. 3, deployment scripts (e.g., 310) and/or integration tests (e.g., 340) can be run in the same container environment (e.g., 300) and share the same application context object (e.g., 320).

The techniques and architectures described herein can provide separation of concerns in terms of deployment and integration testing for Delta Lake Spark (and other types of) application in a shared environment (e.g., Databricks). In some embodiments, with the design of a scenario, applications and tests can be organized, and test cases can be developed within a scenario. In some embodiments, utilizing scenario specifications, scenario-based deployment and integration testing can be achieved. In some embodiments, utilizing namespaces and application context, an isolated application runtime context can be built for each integration testing execution in a shared (e.g., Databricks) environment.

Figure 4:
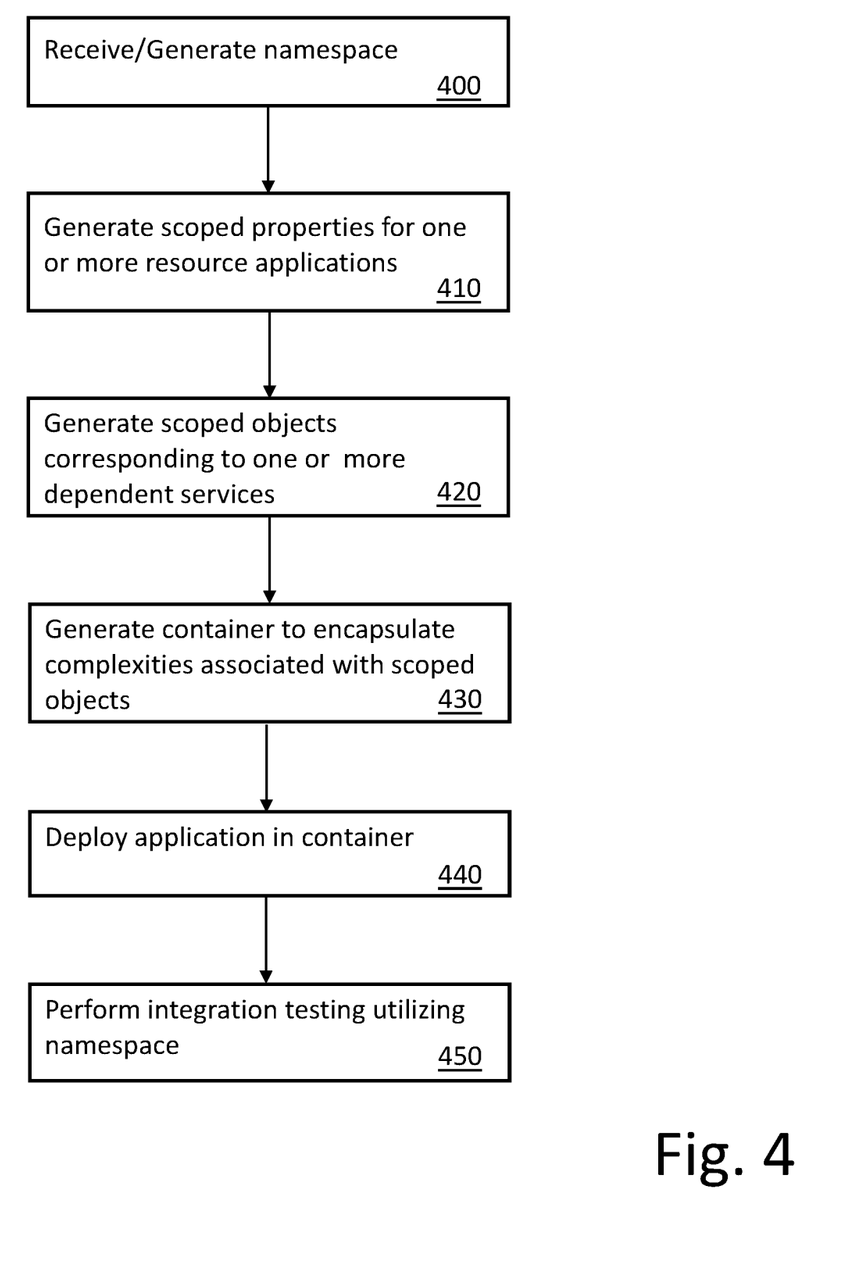
FIG. 4 is a flow diagram of one embodiment of a technique to deploy and test an application in an isolated runtime context.

FIG. 4 is a flow diagram of one embodiment of a technique to deploy and test an application in an isolated runtime context. The technique of FIG. 4 can be provided in any environment that supports use of containers and the desired supporting services/applications.

A namespace to be utilized is retrieved/received/generated, 400. As discussed above, the namespace is a string or other identifier that can be used to generate the scoped objects/services within the isolated runtime context. In one embodiment, the namespace is a text string.

Scoped properties are generated for one or more resource applications, 410. As illustrated in FIG. 1, various resource applications (e.g., stream processing platform 120, sync/naming platform 130, object storage platform 140, database platform 150, log management platform 160, data analytics platform 170) can be utilized to provide services to an application (e.g., application 110). In one embodiment, the scoped properties are based on the namespace and one or more application properties.

One or more scoped objects corresponding to the resource applications are generated, 420. In various embodiments, the scoped objects are generated for each resource service based on the generated scoped properties. Conceptually, one embodiment of this technique this is illustrated in FIG. 2.

A container to encapsulate the scoped objects and associated data/metadata (e.g., complexities) is generated, 430. The application can be deployed to the generated container, 440. Integration testing can be performed utilizing the namespace scoped values and objects, for example, as illustrated in FIG. 3.

Figure 5:
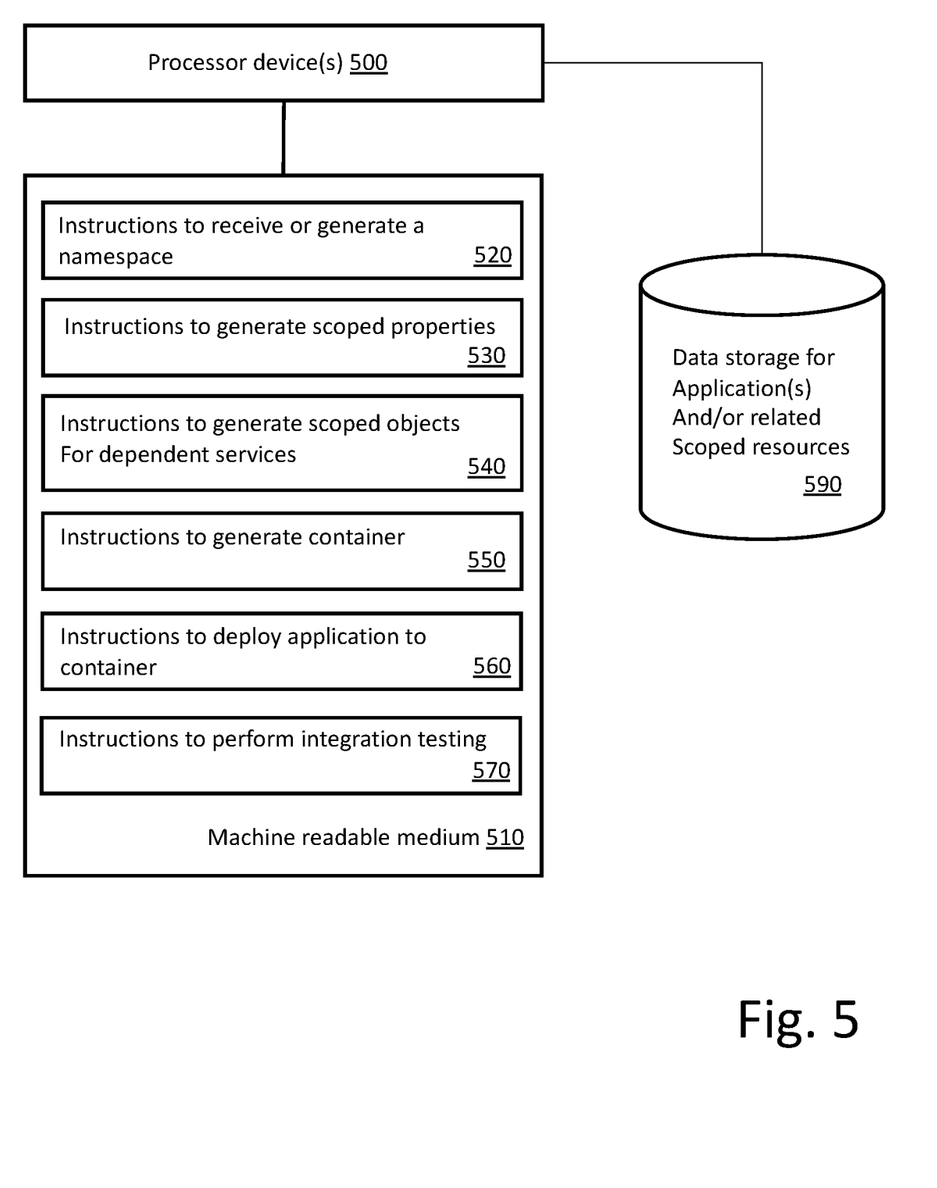
FIG. 5 is a block diagram of one embodiment of a processing resource and a machine readable medium encoded with example instructions to provide a technique to deploy and test an application in an isolated runtime context.

FIG. 5 is a block diagram of one embodiment of a processing resource and a machine readable medium encoded with example instructions to provide a technique to deploy and test an application in an isolated runtime context. Machine readable medium 510 is non-transitory and is alternatively referred to as a non-transitory machine readable medium 510. In some examples, the machine readable medium 510 may be accessed by processor device(s) 500. Processor device(s) 500 and machine readable medium 510 may be included in computing nodes within a larger computing architecture.

Machine readable medium 510 may be encoded with example instructions 520, 530, 540, 550, 560 and 570. Instructions 520, 530, 540, 550, 560 and 570, when executed by the processor device(s) 500, may implement various aspects of the techniques for providing isolated runtime contexts as described herein.

In some embodiments, instructions 520 cause processor device(s) 500 to receive a namespace identifier, for example, through a user interface or other mechanism. In other embodiments, instructions 520 cause processor device(s) 500 to generate the namespace identifier. The namespace identifier can be stored, for example, on data storage device 590 or on another storage or memory device.

In some embodiments, instructions 530 cause processor device(s) 500 to generate one or more scoped properties. As discussed above, the scoped properties can be generated utilizing the namespace identifier. In some embodiments, data and/or metadata associated with the scoped properties can be stored, for example, on data storage device 590 or on another storage or memory device.

In some embodiments, instructions 540 cause processor device(s) 500 to generate one or more scoped objects for dependent services. As discussed above, the scoped objects can be generated utilizing the namespace identifier. In some embodiments, data and/or metadata associated with the scoped objects can be stored, for example, on data storage device 590 or on another storage or memory device.

In some embodiments, instructions 550 cause processor device(s) 500 to generate a container to host an isolated runtime context for an application. As discussed above, the container can be generated utilizing the namespace identifier. In some embodiments, data and/or metadata associated with the container can be stored, for example, on data storage device 590 or on another storage or memory device.

In some embodiments, instructions 560 cause processor device(s) 500 to generate deploy the application to the container. In some embodiments, instructions 570 cause processor device(s) 500 to perform integration testing on the application utilizing the namespace as described above.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:
   generate one or more scoped properties utilizing a namespace identifier, wherein the namespace identifier is an identifier used to define a scope of at least an isolated application runtime context;
   store the namespace identifier on at least one physical storage device;
   generate one or more scoped objects corresponding to one or more dependent services utilizing the one or more scoped properties and the namespace identifier;
   deploy a target application to a container corresponding to the isolated application runtime context, the target application to interact with at least some of the dependent services utilizing the namespace identifier;
   run at least one integration test on the target application in the container, wherein the integration tests refer to the isolated application runtime context utilizing the namespace identifier.

2. The non-transitory computer-readable medium of claim 1 wherein the isolated runtime context comprises a group of artifacts created in the one or more dependent services having the same namespace identifier that are privately accessible by the target application.

3. The non-transitory computer-readable medium of claim 2 wherein the isolated runtime context comprises at least a data structure of key/value pairs, the key of each pair to indicate an artifact type and the value of each pair to indicate a namespace-decorated reference to the artifact in one of the one or more dependent services.

4. The non-transitory computer-readable medium of claim 1 wherein the namespace identifier is provided as either a program argument or an environment variable.

5. The non-transitory computer-readable medium of claim 1 wherein the one or more dependent services comprises at least one data logging platform.

6. The non-transitory computer-readable medium of claim 1 wherein the one or more dependent services comprises at least one data analytics platform.

7. The non-transitory computer-readable medium of claim 1 wherein an application context takes the namespace identifier from a program argument or from an environment variable.

8. A method comprising:
generating one or more scoped properties utilizing a namespace identifier, wherein the namespace identifier is an identifier used to define a scope of at least an isolated application runtime context;
generating one or more scoped objects corresponding to one or more dependent services utilizing the one or more scoped properties and the namespace identifier;
deploying a target application to a container corresponding to the isolated application runtime context, the target application to interact with at least some of the dependent services utilizing the namespace identifier;
running at least one integration test on the target application in the container, wherein the integration tests refer to the isolated application runtime context utilizing the namespace identifier.

9. The method of claim 8 wherein the isolated runtime context comprises a group of artifacts created in the one or more dependent services having the same namespace identifier that are privately accessible by the target application.

10. The method of claim 9 wherein the isolated runtime context comprises at least a data structure of key/value pairs, the key of each pair to indicate an artifact type and the value of each pair to indicate a namespace-decorated reference to the artifact in one of the one or more dependent services.

11. The method of claim 8 wherein the namespace identifier is provided as either a program argument or an environment variable.

12. The method of claim 8 wherein the one or more dependent services comprises at least one data logging platform.

13. The method of claim 8 wherein the one or more dependent services comprises at least one data analytics platform.

14. The method of claim 8 wherein an application context takes the namespace identifier from a program argument or from an environment variable.

15. A system comprising:

a memory system having multiple memory devices;

one or more hardware processors coupled with the memory system, the one or more hardware processors configurable to generate one or more scoped properties utilizing a namespace identifier, wherein the namespace identifier is an identifier used to define a scope of at least an isolated application runtime context, to generate one or more scoped objects corresponding to one or more dependent services utilizing the one or more scoped properties and the namespace identifier, to deploy a target application to a container corresponding to the isolated application runtime context utilizing the namespace identifier, the target application to interact with at least some of the dependent services, and to run at least one integration test on the target application in the container, wherein the integration tests refer to the isolated application runtime context utilizing the namespace identifier.

16. The system of claim 15 wherein the isolated runtime context comprises a group of artifacts created in the one or more dependent services having the same namespace identifier that are privately accessible by the target application.

17. The system of claim 16 wherein the isolated runtime context comprises at least a data structure of key/value pairs, the key of each pair to indicate an artifact type and the value of each pair to indicate a namespace-decorated reference to the artifact in one of the one or more dependent services.

18. The system of claim 15 wherein the namespace identifier is provided as either a program argument or an environment variable.

19. The system of claim 15 wherein the one or more dependent services comprises at least one data analytics platform.

20. The system of claim 15 wherein an application context takes the namespace identifier from a program argument or from an environment variable.

* * * * *